Patented Mar. 2, 1943

2,312,395

UNITED STATES PATENT OFFICE 2,312,395

ACYLATED P-AMINOBENZYL AMINES AND THEIR QUATERNARY DERIVATIVES

Kurt Engel, Saint Louis, Upper Rhine, France, and Kurt Pfaehler, Riehen, near Basel, Switzerland, assignors to the firm J. R. Geigy A. G., Basel, Switzerland No Drawing. Application May 31, 1939, Serial No. 276,744. In Switzerland June 10, 1938

7 Claims. (Cl. 260—401)

This invention relates to an improvement in or modification of the invention forming the subject of our U. S. Patent No. 2,229,803, filed May 24, 1938.

That application describes a process for the production af acylated p-aminobenzyl amines according to the following general diagram:

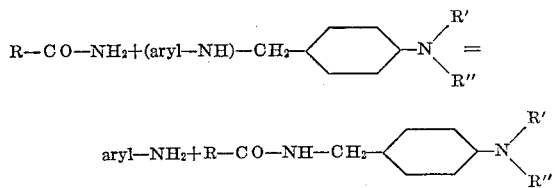

wherein R—CO— represents the acyl radical of a higher molecular, aliphatic or alicyclic fatty acid containing more than 5 C-atoms, which may be saturated or unsaturated, substituted or unsubstituted, R' and R'' represent alkyl, cycloalkyl or aralkyl radicals, which may be the same or different; one of R' and R'' may also be hydrogen.

According to the present improvement or modification new acylated p-aminobenzyl amines are obtained by employing carbonic acid amides which contain at least one —CO.NH$_2$ or —CO.NH— group and in addition a higher molecular, aliphatic or alicyclic radical containing more than 5 C-atoms which may be saturated or unsaturated, substituted or not.

The carbonic acid amides used in the present case are constituted for example according to the following diagram:

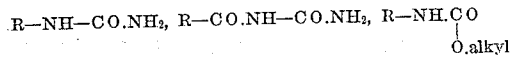

wherein R represents a higher molecular, aliphatic or alicyclic radical containing more than 5 C-atoms, which may be saturated or unsaturated, substituted or unsubstituted.

The aminobenzyl aryl amines used as initial material are generally produced by the treatment of primary amino compounds, which form only an unstable anhydro-compound with formaldehyde (such as for example p-toluidine, sulphanilic acid, their isomers and homologues, and naphthylamine sulphonic acids), with formaldehyde (or substances reacting in the same manner as this) and secondary and tertiary aromatic amines with a free p-position, which contain the above mentioned N— substituent R' and R''.

The p-aminobenzyl aryl amines used here as initial material are also converted with said carbonic acid amides under formation of a new entirely stable C—N— linkage.

By treatment of the reaction product with alkylating agents according to usual processes, the new compounds obtained can be converted into the quaternary derivatives, whereby valuable wetting, dispersing and emulsifying agents, and more especially softening agents for cotton or precipitated cellulose, are obtained.

The following examples illustrate the invention:

*Example 1*

120 g. stearoyl urea, produced in the known manner from stearic acid chloride and urea, and 120 g. p-dimethyl amino benzyl sulphanilic acid are heated in an autoclave together with 280 g. concentrated ammonia and 120 g. water for 6 hours at 150° C. After cooling the reaction mass is sucked off and washed with water. If necessary it is taken up for purification in hot amyl alcohol, the water is separated and the amyl alcoholic solution is filtered. After distilling off the solvent, the new body is obtained as a brown wax-like mass.

The quaternary ammonium compound is obtained by heating 20 g. of the amide with 12 ccm. diethyl sulphate until the product is clearly soluble in hot water. The new compound has the following formula:

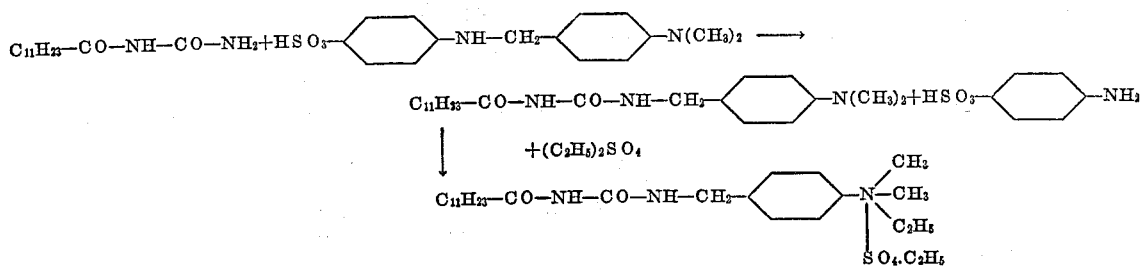

Example 2

With 112 g. heptadecyl urea, produced from heptadecyl amine and potassium cyanate, instead of stearoyl urea, there is obtained according to Example 1 a compound easily soluble in water, which also possesses valuable capillary active properties. It is especially suitable as a softening agent for cotton and precipitated cellulose. The new compound has the following formula:

phanilic acid of 92.1% strength and 500 vol. parts of ammonia of 25% strength are heated for 6 hours at 160° C. in a rotating autoclave. After cooling down its content is filtered off. The residue is washed several times without water and dried under reduced pressure by melting. 110 parts of a wax-like mass are obtained.

41 parts of this condensation product and 14 parts of dimethyl sulphate are stirred over night on the water-bath after which the product has

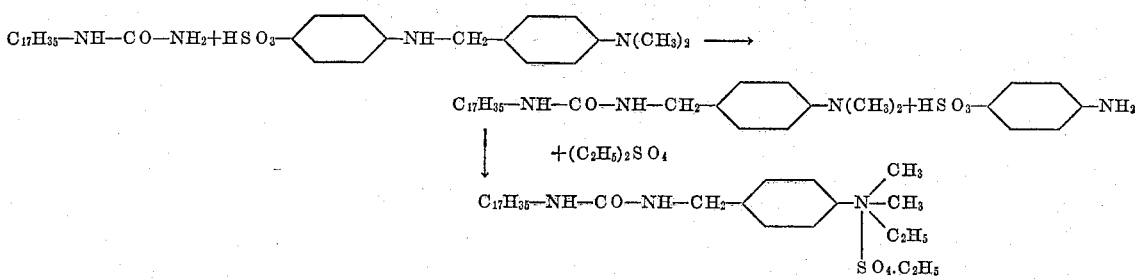

Instead of the p-dimethyl amino benzyl sulphanilic acid used in the above examples it is possible to use the reaction products of other primary compounds, which form only an unstable anhydro-compound with formaldehyde, for example metanilic acid, aniline-disulphonic acids, 1:2-toluidine-4-sulphonic acid and p-toluidine, with formaldehyde and aromatic secondary and tertiary amines. Amongst the latter may be mentioned: diethylaniline, ethyl- or methyl-benzyl-aniline, ethyl-o-toluidine, and cyclo-hexylaniline.

Instead of stearoyl urea there may be used the acyl ureas of other higher fatty acids and mixtures thereof. There may be mentioned the monoacylated ureas of oleic acid, 9:10-dihydroxy- or dichlorstearic acid, α-chlorlauric acid, α-ethoxystearic acid, palm kernel fatty acid, naphthenic acid, and of the hydrogenated fish oil fatty acid.

Instead of the mono-heptadecyl urea there may be used other mono-alkylated ureas, such as undecyl urea, and heptadecenyl urea.

Example 3

89 parts of heptadecylcarbamic acid methyl ester, 110 parts of p-dimethyl amino benzyl sulbecome clearly soluble in water. A brown paste is obtained. The new compound has the following formula:

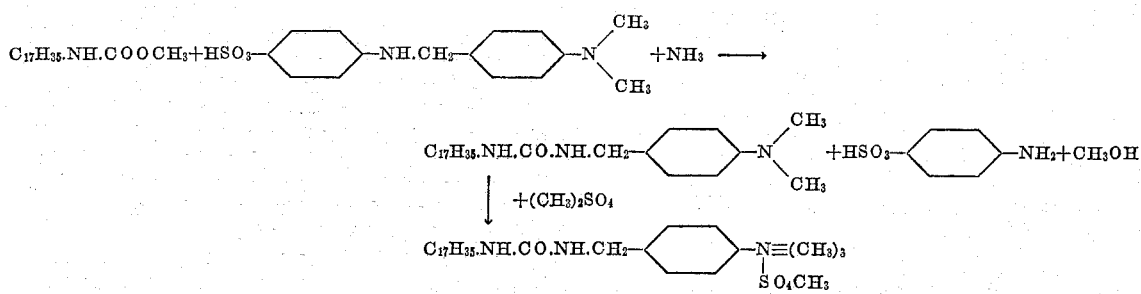

Example 4

87 parts of undecylcarbamic acid-methyl- or -ethylester made according to the Hofmann reaction from the amide of palm nut fatty-acid, 130 parts of p-dimethyl amino benzyl sulphanilic acid of 91.8% strength and 500 vol. parts of ammonia of 25% strength are heated for 6 hours at 160° C. in a rotating autoclave. After cooling down the reaction product is dissolved in ether or in another organic solvent, this solution is dried and the solvent distilled off.

36 parts of the obtained yellow oil are stirred with 14 parts of dimethyl sulphate for 6 hours on the water-bath or for 3 hours at 120° C. until a test proves to be clearly soluble in hot water. There is obtained a brown viscous oil.

Or 36 parts of the yellow oil (see §1 of this example) are stirred with 17 parts of dimethyl sulphate, at first for 4 hours on the water-bath, then again for 4 hours at 120° C. until a test is clearly soluble in water. There is obtained a slightly brown paste. The new compound has the following formula:

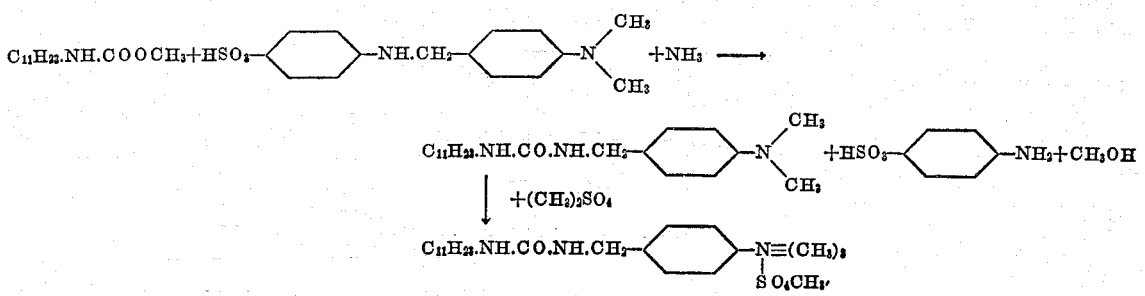

What we claim is:

1. A process for the production of acylated p-aminobenzyl amines, which comprises causing a carbonic acid amide selected from the group consisting of the compounds of the formulae R—NH—CO.NH₂, and R—CO.NH—CO.NH₂, R being a higher molecular, aliphatic hydrocarbon radical with at least 11 C-atoms, to react with a p-aminobenzyl arylamine of the formula

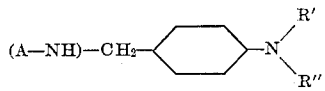

wherein (A—NH)— means the radical of a primary amine selected from the group consisting of the sulphonic acids of monoamines of the benzene and naphthalene series and R' and R'' represent substituents selected from the group consisting of H, alkyl, cycloalkyl and aralkyl radicals, only one of the R' and R'' being at most identical with H.

2. A process for the production of acylated p-aminobenzyl amines, which comprises causing a carbonic acid amide of the formula

R—NH—CO.NH₂

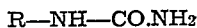

R representing a higher molecular, aliphatic hydrocarbon radical with at least 11 C-atoms, to react with a p-aminobenzyl arylamine of the formula

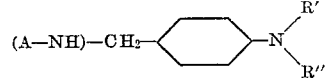

wherein (A—NH)— means the radical of a primary amine selected from the group consisting of the sulphonic acids of monoamines of the benzene and naphthalene series and R' and R'' represent substituents selected from the group consisting of H, alkyl, cycloalkyl and aralkyl radicals, only one of the R' and R'' being at most identical with H.

3. A process for the production of acylated p-aminobenzyl amines, which comprises causing a carbonic acid amide of the formula

R—CO.NH—CO.NH₂

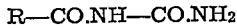

R representing a higher molecular, aliphatic hydrocarbon radical with at least 11 C-atoms, to react with a p-aminobenzylaryl amine of the formula

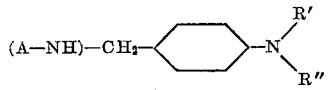

wherein (A—NH)— means the radical of a primary amine selected from the group consisting of the sulphonic acids of monoamines of the benzene and naphthalene series and R' and R'' represent substituents selected from the group consisting of H, alkyl, cycloalkyl and aralkyl radicals, only one of the R' and R'' being at most identical with H.

4. A process for producing quaternary derivatives of acylated p-aminobenzyl amines, consisting in treating the reaction product obtained according to claim 1 with a dialkyl sulphate.

5. A process for producing a quaternary derivative of an acylated p-aminobenzyl amine, which comprises heating stearoyl urea and p-dimethylamino-benzyl sulphanilic acid with concentrated ammonia in presence of water to 150–160° C. and treating the compound thus obtained with a dialkyl sulphate.

6. A process for producing a quaternary derivative of an acylated p-aminobenzyl amine, which comprises heating heptadecyl urea and p-dimethylamino-benzyl sulphanilic acid with concentrated ammonia in presence of water to 150–160° C. and treating the compound thus obtained with a dialkyl sulphate.

7. The new acylated p-aminobenzyl amines of the formula

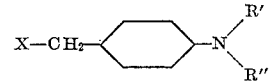

X being a radical selected from the group consisting of R.NH.CO.NH— and R.CO.NH.CO.NH—, R being a high molecular aliphatic hydrocarbon radical with at least 11 C-atoms, and R' and R'' representing substituents selected from the group consisting of H, alkyl, cycloalkyl and aralkyl radicals, only one of the R' and R'' being at most identical with H.

KURT ENGEL.
KURT PFAEHLER.